United States Patent

Ruf et al.

[11] Patent Number: 5,188,434
[45] Date of Patent: Feb. 23, 1993

[54] PROCESS FOR INCREASING THE CONTROLLABILITY OF A VEHICLE

[75] Inventors: Wolf-Dieter Ruf, Waldstetten; Uwe Hartmann, Stuttgart; Friedrich Kost, Kornwestheim; Anton Van Zanten, Ditzingen, all of Fed. Rep. of Germany

[73] Assignee: Robert Bosch GmbH, Stuttgart, Fed. Rep. of Germany

[21] Appl. No.: 687,877

[22] PCT Filed: Nov. 16, 1989

[86] PCT No.: PCT/EP89/01380
§ 371 Date: Jun. 3, 1991
§ 102(e) Date: Jun. 3, 1991

[87] PCT Pub. No.: WO90/06251
PCT Pub. Date: Jun. 14, 1990

[30] Foreign Application Priority Data

Dec. 1, 1988 [DE] Fed. Rep. of Germany ....... 3840456

[51] Int. Cl.$^5$ ............................................. B60T 8/24
[52] U.S. Cl. ................................. 303/111; 303/113.4
[58] Field of Search ....................... 364/426.01–426.03; 303/91, 100, 102, 103, 111, 113 SS, 113 AP

[56] References Cited

U.S. PATENT DOCUMENTS

| 3,926,477 | 12/1975 | Klatt | 303/111 |
| 4,758,053 | 7/1988 | Yasuno | 303/91 |
| 4,840,243 | 6/1989 | Hirabayashi et al. | 303/100 X |
| 4,848,851 | 7/1989 | Kuraoka et al. | 303/100 |
| 4,849,891 | 7/1989 | Krohn et al. | 364/426.01 X |
| 5,024,285 | 6/1991 | Fujita | 364/426.03 X |

FOREIGN PATENT DOCUMENTS 3624007 1/1988 Fed. Rep. of Germany.
3731075 3/1989 Fed. Rep. of Germany.

Primary Examiner—Robert J. Oberleitner
Assistant Examiner—Alfred Muratori
Attorney, Agent, or Firm—Felfe & Lynch

[57] ABSTRACT

A brake-pressure controller regulates the brake pressure on the individual wheels according to the instantaneous slip values in comparison with variable desired slip values. The angle of inclination of one wheel of each axle is determined, and the desired slip values are varied as a function of these angles of inclination with the effect of a better vehicle controllability.

8 Claims, 6 Drawing Sheets

PROCESS FOR INCREASING THE CONTROLLABILITY OF A VEHICLE

BACKGROUND OF THE INVENTION

In conventional ABS designs, the longitudinal dynamics of the vehicle are of primary importance, if only for reasons of sensory analysis (revolution sensor). Suitable matching is necessary in order to obtain a good, invariable compromise between the braking distance and controllability for widely differing roads and driving maneuvers.

Whereas, during braking in a straight line, the driver's need for maximum deceleration in the longitudinal direction of the vehicle can be understood clearly, a conflict of aims arises during simultaneous steering movements, since the brake force and lateral guiding force cannot be at their maximum at the same time. If it is assumed that a driver wants instantaneously to change the state of movement of his vehicle as much as possible, it seems plausible to maximize the resultant force arising from the brake force and lateral guiding force. If there are no possibilities of varying the angles of inclination by an active steering intervention, there remains as a "possibility of rapid intervention" the tire slip (in the longitudinal direction) which can be set by means of ABS valves to a new desired value after 100–200 ms at the latest.

An anti-lock control system is known from DE-Al-3,611,822, to which U.S. Pat. No. 4,758,053 corresponds. In this the desired slip values on the individual axles are varied as a function of the steering angle and of the yawing movement.

SUMMARY OF THE INVENTION

The control concept differs from the pure wheel controllers working on the optimizer principle and set at the maximum brake force, if only in that, during running at an inclination, the working point of the controller does not shift to higher slip values, but is first maintained at the optimum value for braking in a straight line, and furthermore on specific wheels the slip is reduced. The driving behaviour was assumed to have understeering tendencies virtually neutral at low speeds and increasing slightly at an increasing speed:

The angle of inclination on the rear axle is set to a value which, dependent on the instantaneous vehicle speed, is somewhat lower than the angle of inclination of the front axle.

However, this concept is maintained only as long as the angles of inclination on the front wheels do not exceed the maximum permissible angle of inclination as a result of too high a steering lock (for example, the driver's panic reaction). Since there is no possibility of reducing the "overdone" steering angle to a suitable value, in this case the angles of inclination of the rear axle are regulated to the maximum permissible angle of inclination reduced by the amount of the desired "understeering coefficient".

This overriding controller intervenes in the subordinate wheel controller by means of desired slip values $\lambda^*_1$ to $\lambda^*_4$ dependent on the angles of inclination $\alpha_1$ to $\alpha_4$. Before these desired slip values are calculated a distinction is drawn between the following three driving situations. For these, the subordinate controller can have the structure of the slip controllers which are described, for instance, in German Offenlegungsschriften 3,624,007, 3,731,075 and 3,734,878 (to which U.S. Pat. No. 5,070,459 corresponds). In addition, possibilities of direct intervention (via valve opening times or differential pressures when there is a measured wheel-brake cylinder pressure) are possible.

In contrast to the state of the art, in the invention different desired slip values can be preset for all the wheels.

I Driving behaviour with too much understeer:

The angles of inclination on the front and rear axles have the same sign, but the amount of the angle of inclination on the front axle is clearly greater than that on the rear axle. Reducing the desired slip value on the front wheel on the outside of the bend both increases the lateral guiding force at the front and, as a result of the simultaneous reduction of the brake force, generates a slight yawing moment. The two effects improve the steerability. In contrast, the desired slip value of the other wheels is maintained at the original value $\lambda^*$ (as with braking in a straight line), since, if the slip were reduced, the effects would be at least partially cancelled.

II Driving behaviour with oversteer:

The angles of inclination on the front and rear axles have the same sign, the amount of the angle of inclination on the rear axle being greater than that on the front axle. However, oversteer is also detected when too steep a rise of the angles of inclination of the rear axle is measured proportional and differential control).

In this case, in a similar way to the considerations under I, there must be a reduction of the desired slip value on the rear wheel on the inside of the bend.

Driving tests have shown that a simultaneous increase of the slip value on the front wheel on the outside of the bend is advantageous, in order to control this critical driving situation with greater safety. Thus, for example on ice, the actual slip on this front wheel increases briefly to a value which an algorithm operating on the optimizer principle would likewise reach or even exceed during running at an inclination.

III The angles of inclination on the front and rear axles have different signs:

This driving state arises, for example, on $\mu$-split roads (different coefficients of friction) or when the driver attempts to correct the oversteering vehicle by rapid countersteering (this situation is eliminated in the concept described). Reducing the desired slip value on the front and rear wheels on one side of the vehicle increases the stabilizing counter-yawing moment by means of both higher lateral guiding forces and the brake force which is reduced on one side.

Putting the abovementioned control concepts into practice presupposes that, in addition to the slip, the angles of inclination of all four wheels can also be measured or else at least observed. A correlation-optical sensor supplies the speed at this point in terms of amount and direction. A rate gyroscope indicates the angular speed of the vehicle about the vertical axis (yaw-angle speed).

The exact speeds at the wheel centers (reference speeds) and the float angles can be computed from this information. Conventional wheel sensors and a steering-angle sensor are also necessary, so that the finally relevant quantities, namely the slip and angle of inclination, can be determined.

A correlation-optical sensor is not absolutely essential for determining the transverse speed. This can also be obtained approximately by means of other sensors (for example, transverse-acceleration transmitters). Other yaw-angle speedometers are also offered on the market.

A 4-channel ABS hydraulic unit with 3/3-way solenoid valves can be used as an actuator. However, other brakepressure modulators, such as plunger systems are also suitable.

DETAILED DESCRIPTION OF THE PREFERRED EMBODIMENT

Figure 1:
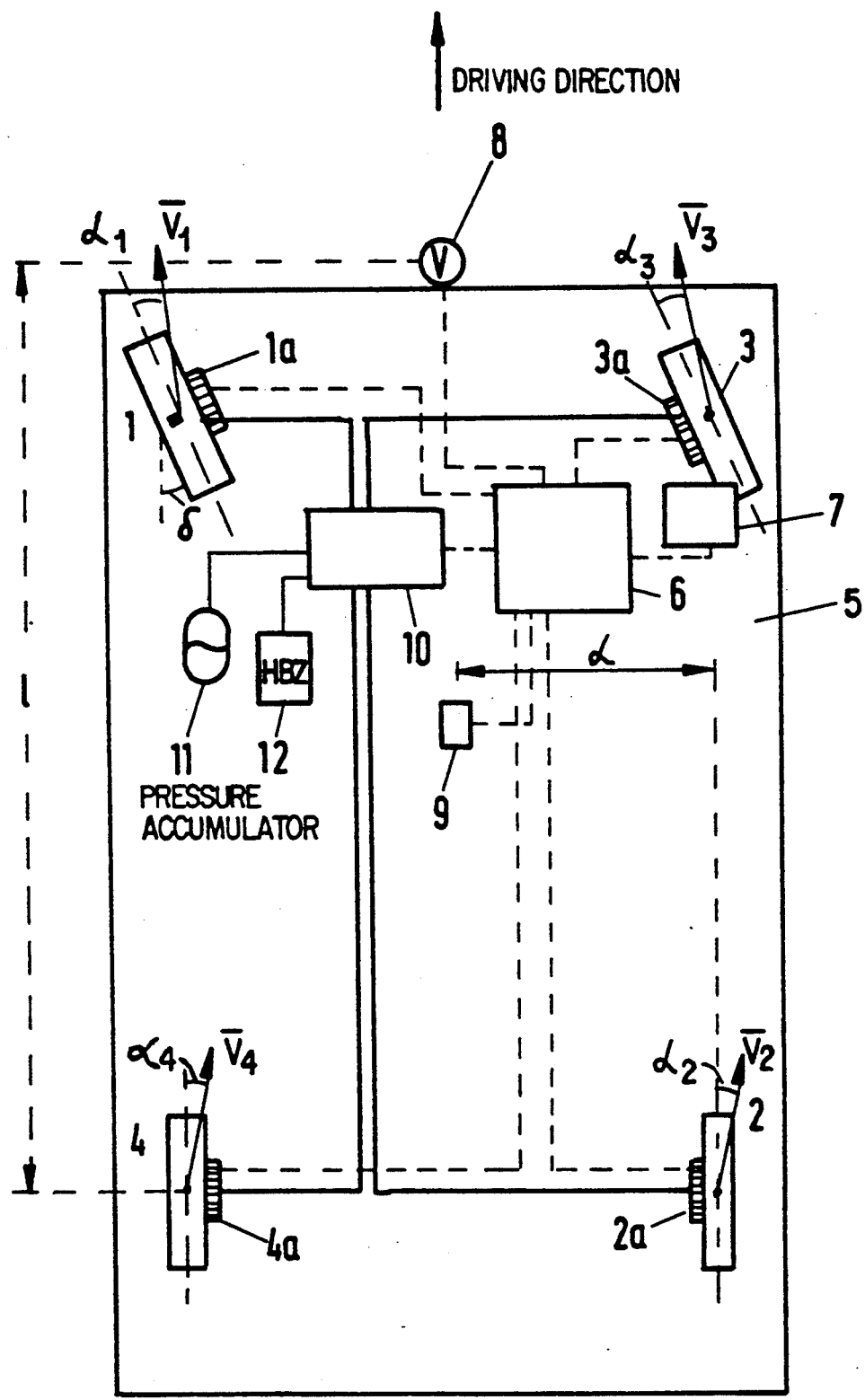
FIG. 1 shows a diagram of a vehicle equipped in accordance with the invention

In FIG. 1, a vehicle 5 has wheels 1 to 4 which are assigned wheel sensors 1a to 4a, the signals of which are fed to an evaluation circuit 6. Furthermore, a steering-angle sensor 7, an absolute-speed transmitter 8 and a yawing-speed transmitter 9 are provided. The brake pressure of a main brake cylinder 12 on the wheel brakes 10 varies by means of a modulator 10 and a pressure source 11.

The angles of inclination $\alpha_3$ and $\alpha_4$ on the respective wheels 3 and 4 are given by $$\tan \alpha_3 = \frac{V_{y3}}{V_{x3}} - \delta$$

where $\delta$ is the steering angle and $$\tan \alpha_4 = \frac{V_{y4}}{V_{x4}}.$$

In this, $V_{xn}$ and $V_{yn}$ are the component speeds of the center of the n'th wheel in the forward and transverse directions. These quantities are obtained from the values $V_x$ and $V_y$ measured by the sensor 8 and from the yawing speed $\phi^o$ (e.g. rad/sec) measured by the sensor 9, taking into account the distances l and d from the sensor, and for the wheel 2 are given by:

$$V_{x2} = V_x - \phi^o.d$$

$$V_{y2} = V_y - \phi^o.l$$

Figure 2:
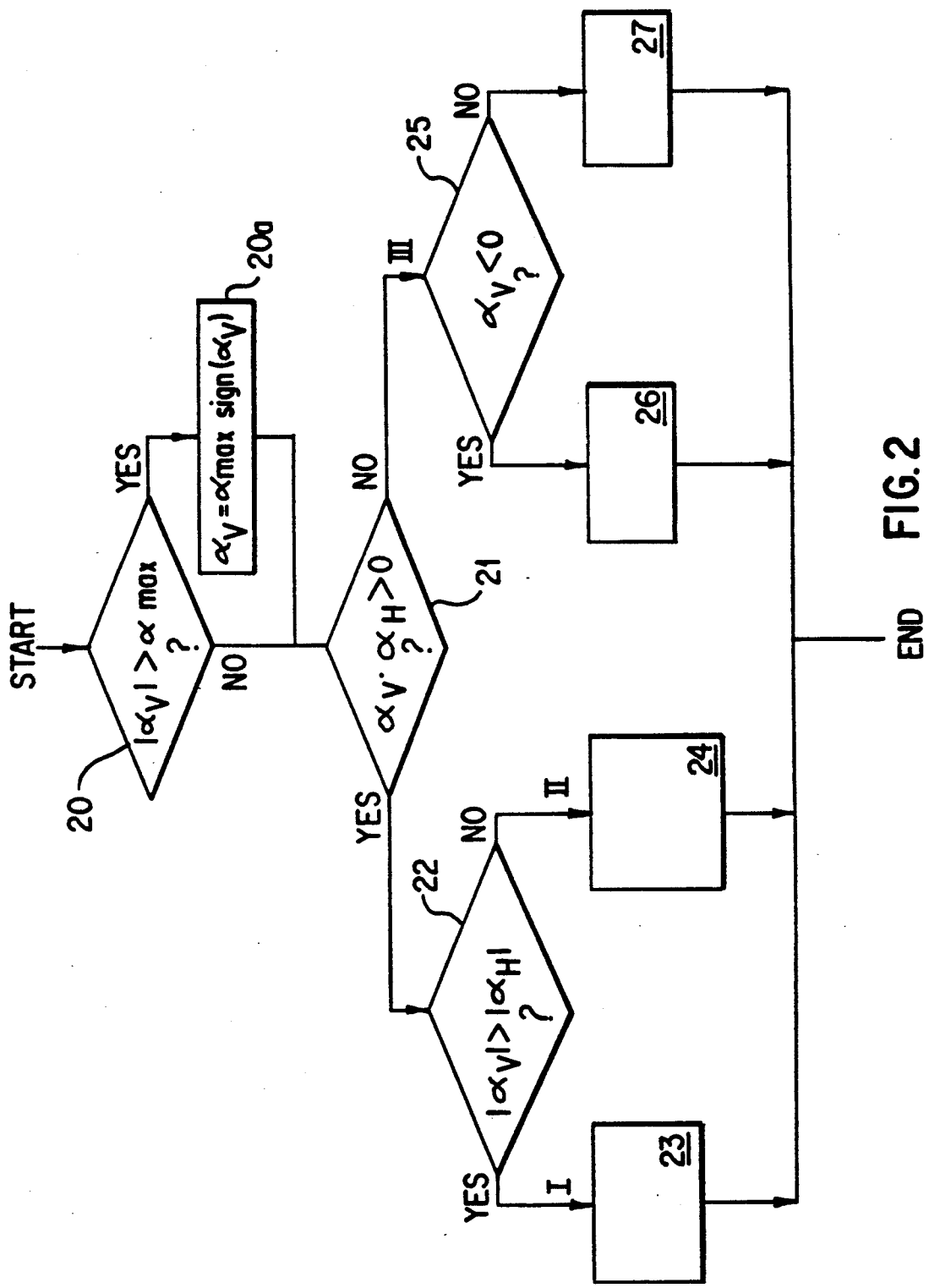
FIG. 2 shows a flowchart

FIG. 2 shows possibilities of how and as a function of what the reference slip value can be varied. In 20, a check is made as to whether the amount of the angle of inclination of the front axle $\alpha_V$ is greater than a maximum amount $\alpha_{max}$. If this is so, it is limited to $\alpha_{max}$ and transmitted together with the (lacuna) sign (block 20a). Block 21 checks whether the angles of inclination $\alpha_V$ at the front and $\alpha_H$ at the rear have the same sign. If this is so, a block 22 checks which of the angles of inclination is the greater. If $\alpha_V$ is the greater, the desired slip value $\lambda^*$ for the front wheel on the outside of the bend is reduced (block 23), whilst if $\alpha_H$ is the greater the reduction of $\lambda^*$ is carried out for the rear wheel on the inside of the bend (block 24). If appropriate, $\lambda^*$ is also increased for the front wheel on the outside of the bend.

The angle of inclination refers to the angle between the wheel velocity vector and the longitudinal axis of the wheel. In FIG. 1, all angles $\alpha_1-\alpha_4$ are positive.

If the values $\alpha_V$ and $\alpha_H$ have different signs, a block 25 ascertains whether $\alpha_V$ is negative. If this is so, the $\lambda^*$ for the wheels on the left side of the vehicle are reduced (block 26), whereas if this is not so the reduction takes place on the right side of the vehicle (block 27).

Figure 3:
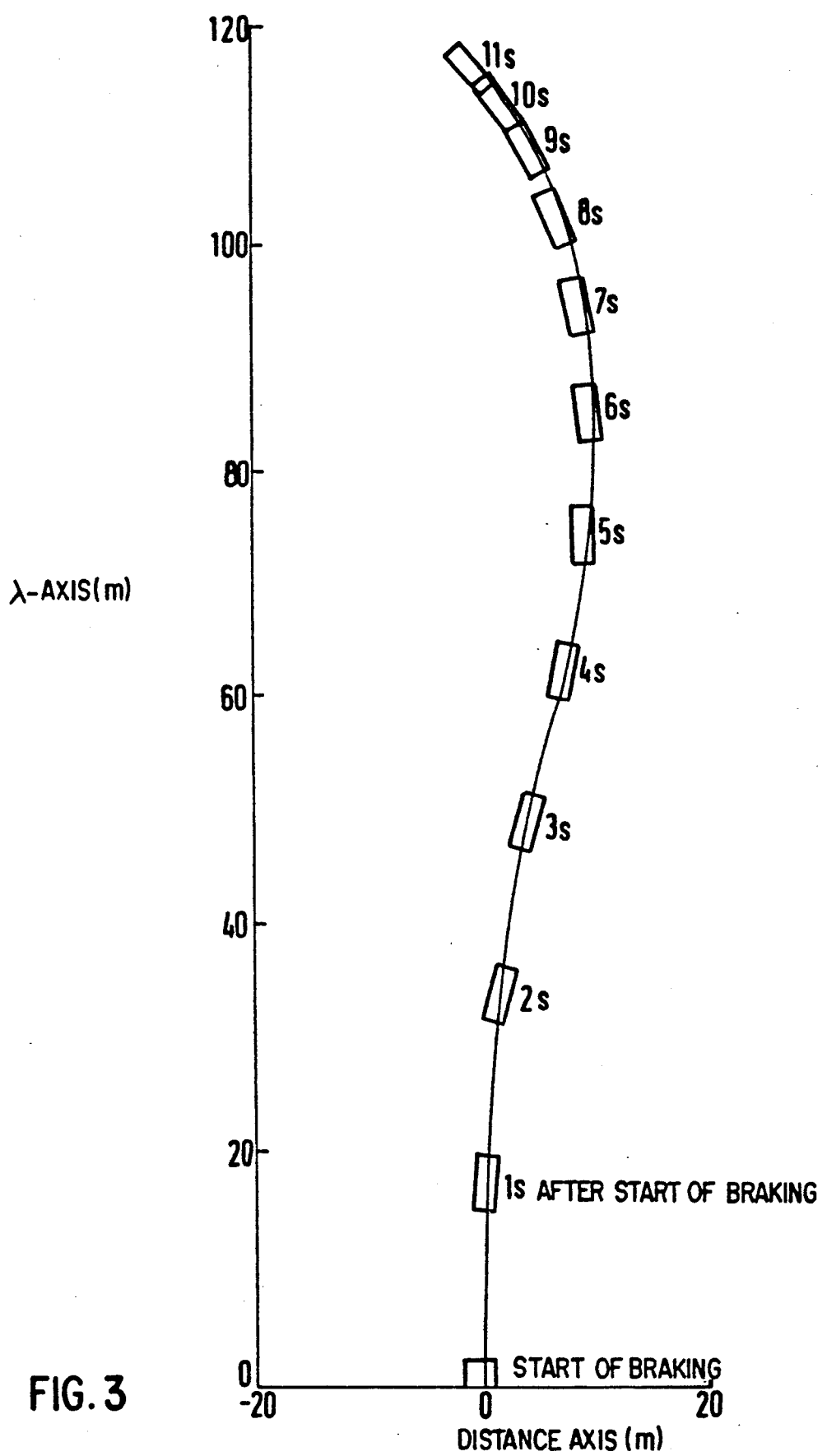
FIGS. 3-6 show graphs.
Figure 4:
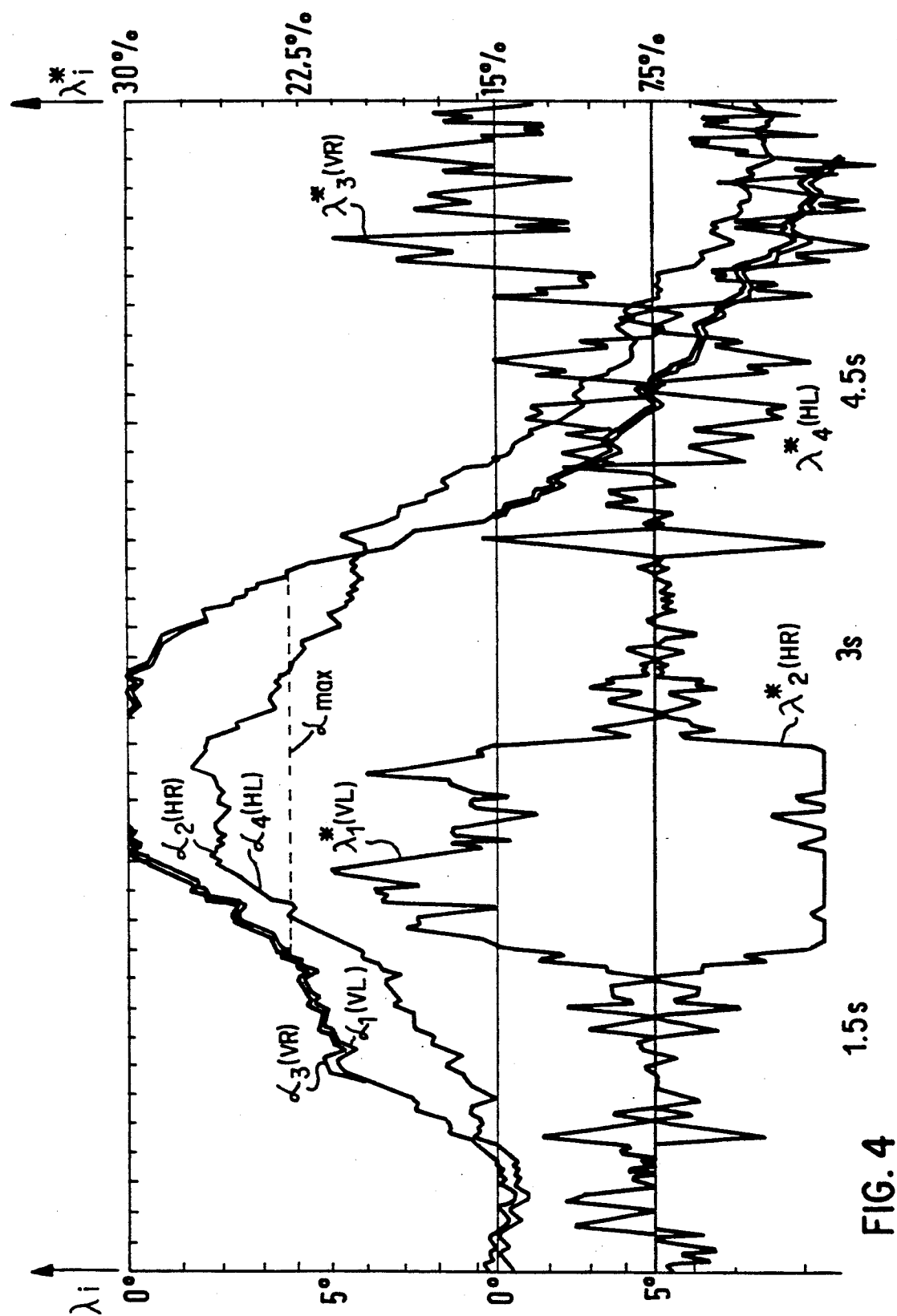

If there is a double steering jump, the swerving of the vehicle (an abrupt increase in the float angle or the angles of inclination of the rear axle) can be prevented only by a pronounced controller intervention (see FIG. 3 t>1.5 s). A similar behaviour to that occurring in the left-hand bend (t<5 s) can also be seen once again in the right-hand bend (t>5 s) (FIGS. 3 and 4).

Figure 5:
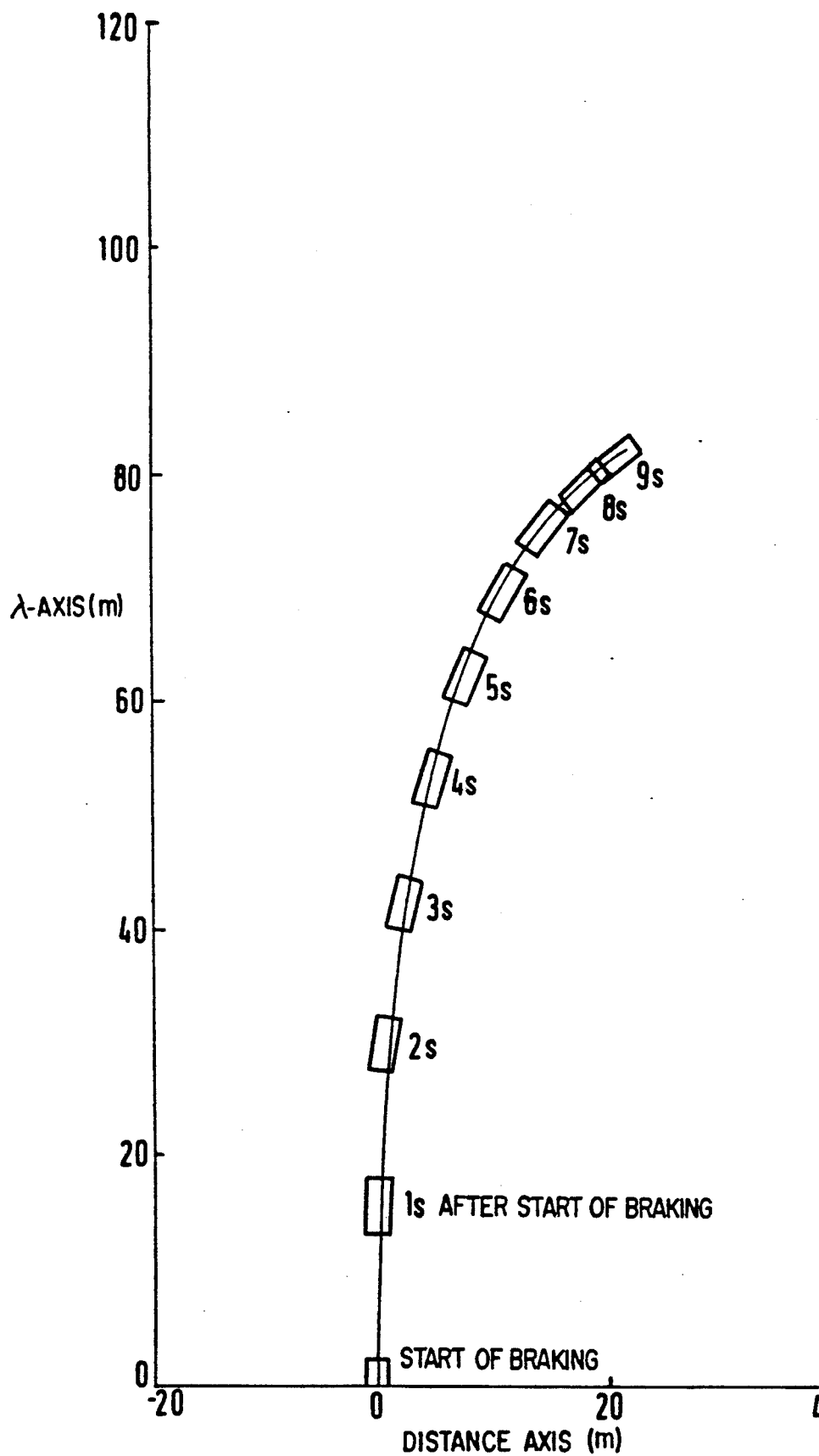
Figure 6:
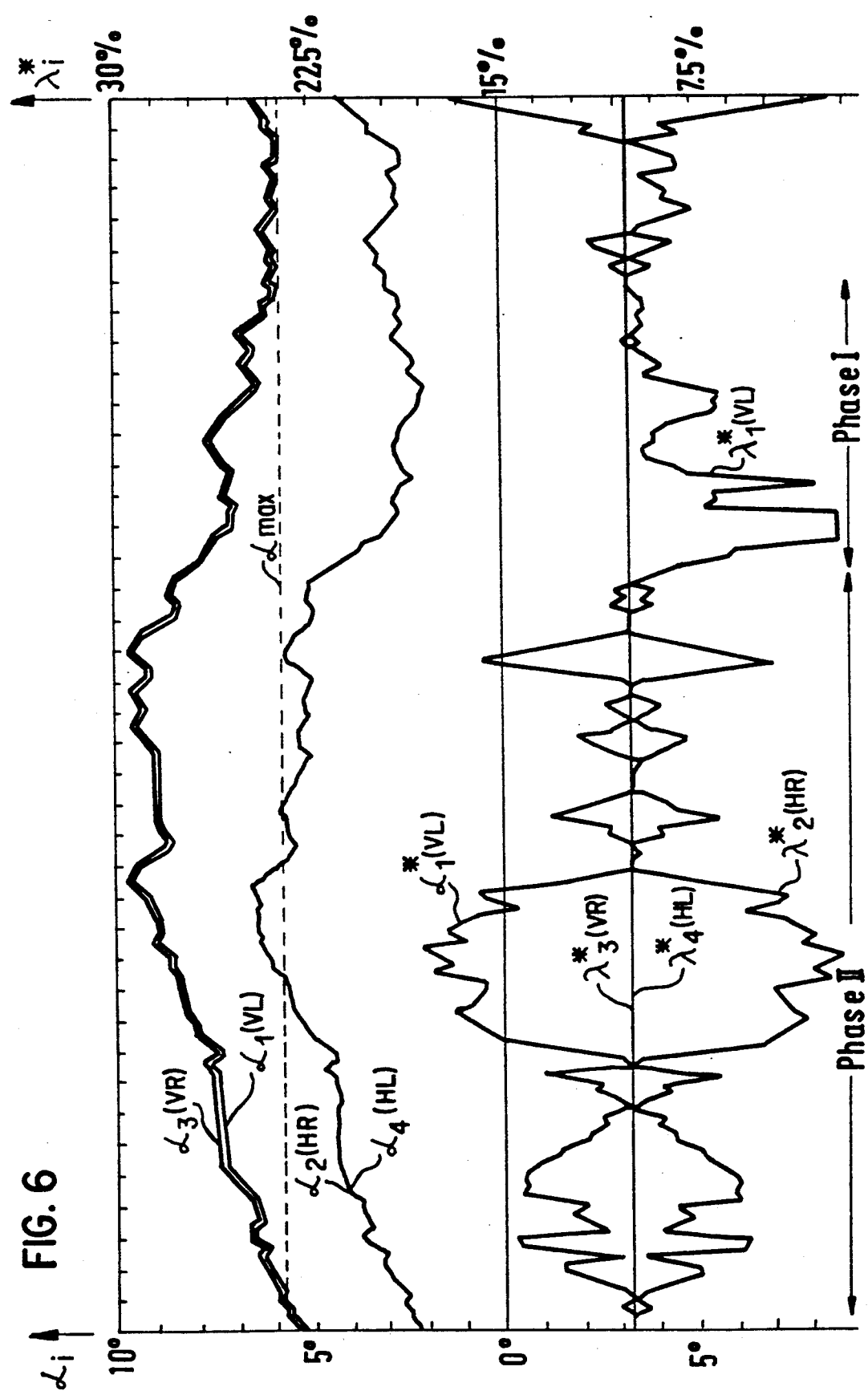

In a single steering jump (for example, 80° to the left), swerving is first prevented by the intervention at $\lambda_1^*$ and $\lambda_2^*$. From approximately t=3 seconds, the slip is reduced on the front wheel on the outside of the bend, in order to obtain higher lateral guiding forces there. The effectiveness of this measure is shown by the renewed increase of the angles of inclination on the front axle (FIGS. 5 and 6).

Stabilization of the vehicle is also possible to a restricted extent in the non-braked (or slightly braked) situation. Since there is no slip reduction, there is no need for a control intervention in phases I and III. Only in phase II, which, however, represents the most dangerous driving situation because of the oversteering, can there be an intervention on the front wheel on the outside of the bend by means of an increase of the slip or pressure. Only a brake force and now only a reduced lateral guiding force act on this wheel, thereby generating a yawing moment which counteracts the oversteering tendency.

However, to put this extended control concept into practice, a pressure supply according to ASR concepts with braking intervention is necessary, allowing pressure to be built up in the wheel-brake cylinders even when the driver does not depress the brake pedal (FIG. 1).

In addition to improving the steerability, the stability of the vehicle is largely guaranteed. Although the driver continues to determine the driving direction of the vehicle, nevertheless the task of stabilizing the vehicle (for example, rapid countersteering when the vehicle swerves) is taken from him. The demands on the driver, especially under winter conditions, are thus markedly reduced. Furthermore, a better utilization of the adhesion potential in the transverse direction of the tires becomes possible.

We claim:
1. Method of stabilizing a vehicle having a front axle with two wheels, a rear axle with two wheels, and means for controlling brake pressure at each wheel, each wheel exhibiting an instantaneous brake slip and an angle of inclination, said method comprising
   determining the instantaneous brake slip for each wheel,
   comparing the instantaneous slip at each wheel to a desired slip value,
   determining the angle of inclination for at least one wheel of each axle,
   varying the desired slip value for each wheel in dependence upon the angles of inclination, and
   controlling the brake pressure at each wheel so that the instantaneous brake slip for each wheel conforms to the desired slip value for the respective wheel.
2. Method as in claim 1 wherein when the brake pressure is less than a predetermined amount, the desired slip is increased.

3. Method as in claim 1 wherein, when the vehicle moves through a curve having an inside and an outside, and when one wheel of each axle has an angle of inclination with the same sign, and the angle of inclination of the wheel of the front axle is greater than the angle of inclination of the wheel of the rear axle, the desired slip value for the front wheel on the outside of the curve is reduced.

4. Method as in claim 1 wherein, when the vehicle moves through a curve having an inside and an outside, and when one wheel of each axle has an angle of inclination with the same sign, and the angle of inclination of the wheel of the rear axle is greater than the angle of inclination of the wheel of the front axle, the desired slip value for the rear wheel on the inside of the curve is reduced.

5. Method as in claim 1 wherein, when the vehicle moves through a curve having an inside and an outside, and when one wheel of each axle has an angle of inclination with the same sign, and the angle of inclination of the wheel of the rear axle is greater than the angle of inclination of the wheel of the front axle, the desired slip value for the front wheel on the outside of the curve is increased.

6. Method as in claim 1 wherein, when the vehicle moves through a curve having an inside and outside, and when the angle of inclination of one wheel of the front axle has a negative sign and the angle of inclination of one wheel of the rear axle has a positive sign, the desired slip values for wheels on the left side of the vehicle are reduced.

7. Method as in claim 1 wherein, when the vehicle moves through a curve having an inside and outside, and when the angle of inclination of one wheel of the front axle has a positive sign and the angle of inclination of one wheel of the rear axle has a negative sign, the desired slip values for wheels on the right side of the vehicle are reduced.

8. Method as in claim 1 wherein the angles of inclination of the wheels of the front axle have an upper limit.

* * * * *